(12) United States Patent
Dougan et al.

(10) Patent No.: US 10,030,533 B2
(45) Date of Patent: Jul. 24, 2018

(54) FLANGED BUSHING FOR VARIABLE VANE

(71) Applicant: United Technologies Corporation, Hartford, CT (US)

(72) Inventors: Donald Dougan, Wallingford, CT (US); Bernard W. Pudvah, Portland, CT (US)

(73) Assignee: United Technologies Corporation, Farmington, CT (US)

( * ) Notice: Subject to any disclaimer, the term of this patent is extended or adjusted under 35 U.S.C. 154(b) by 1557 days.

(21) Appl. No.: 13/727,766

(22) Filed: Dec. 27, 2012

(65) Prior Publication Data

US 2014/0255144 A1 Sep. 11, 2014

Related U.S. Application Data

(60) Provisional application No. 61/704,079, filed on Sep. 21, 2012.

(51) Int. Cl.
*F01D 17/16* (2006.01)
*F04D 29/56* (2006.01)

(52) U.S. Cl.
CPC ......... *F01D 17/162* (2013.01); *F04D 29/563* (2013.01); *Y02T 50/672* (2013.01)

(58) Field of Classification Search
CPC ........ F01D 17/162; F01D 17/16; F01D 17/14; F04D 29/563
See application file for complete search history.

(56) References Cited

U.S. PATENT DOCUMENTS

| | | | | |
|---|---|---|---|---|
| 4,363,600 A * | 12/1982 | Thebert | ................. | F01D 17/162 415/140 |
| 4,668,165 A * | 5/1987 | Ludwick | ............... | F01D 17/162 415/148 |
| 4,767,264 A * | 8/1988 | Kisling | ................. | F01D 17/162 415/156 |
| 4,808,069 A * | 2/1989 | Bonner | ................. | F04D 29/563 384/435 |
| 4,979,874 A * | 12/1990 | Myers | ....................... | F01D 7/00 415/160 |
| 5,024,580 A * | 6/1991 | Olive | .................... | F01D 17/162 403/260 |
| 5,328,327 A * | 7/1994 | Naudet | ................. | F01D 17/162 29/889.22 |
| 5,622,473 A * | 4/1997 | Payling | ................. | F01D 17/162 415/160 |
| 6,481,960 B2 * | 11/2002 | Bowen | ................. | F01D 11/001 415/160 |
| 6,767,183 B2 * | 7/2004 | Schilling | ............... | F01D 17/162 415/160 |
| 6,984,104 B2 * | 1/2006 | Alexander | ............ | F01D 17/162 415/159 |
| 7,011,494 B2 * | 3/2006 | Kies | ....................... | F01D 17/162 415/148 |

(Continued)

*Primary Examiner* — Eldon Brockman
(74) *Attorney, Agent, or Firm* — Carlson, Gaksey & Olds, P.C.

(57) ABSTRACT

An example turbomachine bushing a bushing having a wear surface configured to interface directly with a variable vane assembly to limit radially inward movement of the variable vane assembly, wherein the variable vane assembly is moveable axially between a first position contacting the wear surface and a second position spaced from the wear surface.

20 Claims, 3 Drawing Sheets

(56) References Cited

U.S. PATENT DOCUMENTS

| | | | |
|---|---|---|---|
| 7,094,022 B2 | 8/2006 | Bruce | |
| 7,163,369 B2 | 1/2007 | Bruce | |
| 7,207,770 B2 | 4/2007 | Bruce | |
| 7,214,030 B2 | 5/2007 | Arilla et al. | |
| 7,448,848 B2* | 11/2008 | Alexander | F01D 17/162 415/159 |
| 7,530,784 B2* | 5/2009 | Ribassin | F01D 17/16 415/160 |
| 8,414,248 B2* | 4/2013 | Perez | F01D 17/162 415/1 |
| 8,668,444 B2* | 3/2014 | Jarrett, Jr. | F01D 17/162 415/160 |
| 2004/0052636 A1* | 3/2004 | Schilling | F01D 17/162 415/160 |
| 2004/0146398 A1* | 7/2004 | Bromann | F01D 17/162 415/148 |
| 2006/0285969 A1* | 12/2006 | Maurice Ribassin | F01D 17/16 415/160 |
| 2012/0076658 A1* | 3/2012 | Jarrett, Jr. | F01D 17/162 416/205 |

* cited by examiner

FLANGED BUSHING FOR VARIABLE VANE

CROSS-REFERENCE TO RELATED APPLICATIONS

This application claims priority to U.S. Provisional Application No. 61/704,079, which was filed on 21 Sep. 2012 and is incorporated herein by reference.

BACKGROUND

Turbomachines, such as gas turbine engines, typically include a fan section, a compression section, a combustion section, and a turbine section. Turbomachines may employ a geared architecture connecting portions of the compression section to the fan section.

Some sections of turbomachines may include variable vanes. During operation, the variable vanes are adjusted to influence flow through the turbomachine. Flow through the turbomachine typically biases the variable vanes radially away from a turbomachine's rotational axis.

Thus, variable vanes are typically designed to be biased away from the rotational axis.

Biasing of the variable vanes toward the rotational axis may undesirably expose some structures of the variable vane that can disrupt flow and negatively affect engine performance. Moving the variable vanes toward the axis may undesirably wear away areas of the turbomachine case.

SUMMARY

An example turbomachine bushing according to an exemplary aspect of the present disclosure includes, among other things, a bushing having a wear surface configured to interface directly with a variable vane assembly to limit radially inward movement of the variable vane assembly. The variable vane assembly is moveable axially between a first position contacting the wear surface and a second position spaced from the wear surface.

In a non-limiting embodiment of the foregoing turbomachine bushing, the wear surface may face radially away from a rotational axis of a turbomachine.

In a non-limiting embodiment of either of the foregoing turbomachine bushings, at least a portion of the bushing may be received within a bore that also receives a portion of the variable vane assembly.

In a non-limiting embodiment of any of the foregoing turbomachine bushings, the bushing may interface directly with a vane arm of the variable vane assembly when the variable vane assembly is in the first position.

In a non-limiting embodiment of any of the foregoing turbomachine bushings, the vane arm may include at least one radially inward facing surface that interfaces directly with the bushing when the variable vane assembly is in the first position.

In a non-limiting embodiment of any of the foregoing turbomachine bushings, a vane arm of the variable vane assembly may contact the wear surface when the variable vane assembly is in the first position.

In a non-limiting embodiment of any of the foregoing turbomachine bushings, the bushing may comprise nickel.

In a non-limiting embodiment of any of the foregoing turbomachine bushings, the bushing and a portion of the variable vane assembly that may contact the wear surface are made of the same material.

A turbomachine assembly according to an exemplary aspect of the present disclosure includes, among other things, an annular case, a bushing, a variable vane having a portion received within a bore of the case, and a vane arm configured to rotate the variable vane. The variable vane and vane arm are biased toward a rotational axis of the turbomachine or away from the rotational axis in response to flow. The vane arm contacts the bushing when the variable vane is biased toward the rotational axis. The vane arm is spaced from the bushing when the variable vane is biased away from the rotational axis.

In a non-limiting embodiment of the foregoing turbomachine assembly, the annular case may be a compressor case.

In a non-limiting embodiment of either of the foregoing turbomachine assemblies, the bushing may be press-fit within the bore.

In a non-limiting embodiment of any of the foregoing turbomachine assemblies, the vane arm may provide an aperture that receives a portion of the variable vane.

In a non-limiting embodiment of any of the foregoing turbomachine assemblies, the portion of the variable vane may comprise a vane stem.

In a non-limiting embodiment of any of the foregoing turbomachine assemblies, the aperture may be within a claw portion of the variable vane, the claw portion having claw surfaces facing radially inward toward the rotational axis, the claw surfaces contacting the bushing when the variable vane is biased toward the rotational axis.

A method of limiting wear in a turbomachine according to an exemplary aspect of the present disclosure includes, among other things, providing a bushing wear surface that contacts a variable vane surface when the assembly is biased toward a rotational axis of a turbomachine.

In a non-limiting embodiment of the foregoing method, the method may include moving the variable vane assembly away from the bushing wear surface when the assembly is biased away from the rotational axis of the turbomachine.

In a non-limiting embodiment of either of the foregoing methods, the bushing wear surface may be configured to contact a vane arm of the variable vane assembly.

In a non-limiting embodiment of any of the foregoing methods, the variable vane surface may face the rotational axis.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
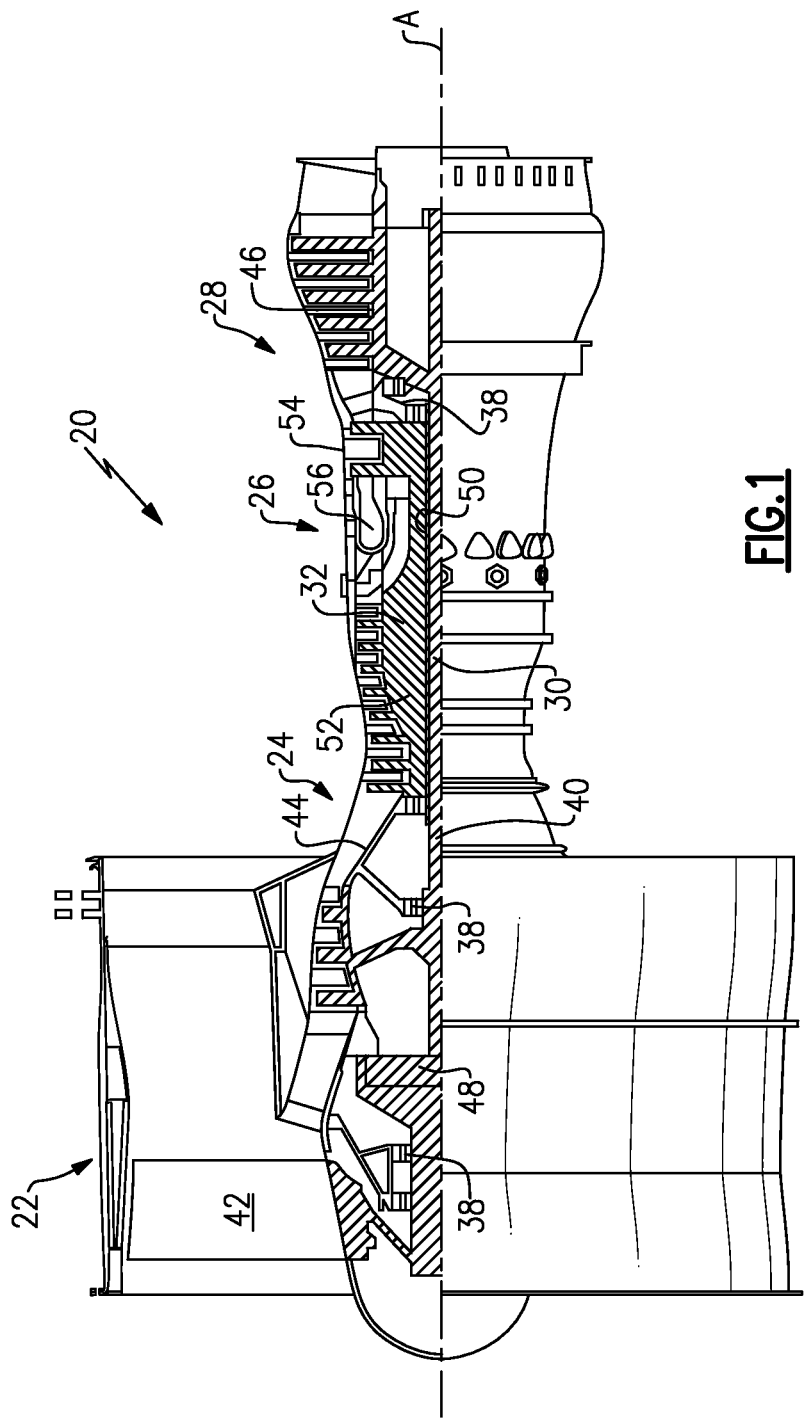
FIG. 1 shows a section view of an example gas turbine engine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition -- typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of [(Tram ° R)/(518.7° R)]^0.5. The Temperature represents the ambient temperature in degrees Rankine. The Low Corrected Fan Tip Speed according to one non-limiting embodiment of the example engine 20 is less than about 1150 fps (351 m/s). The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

Figure 2:
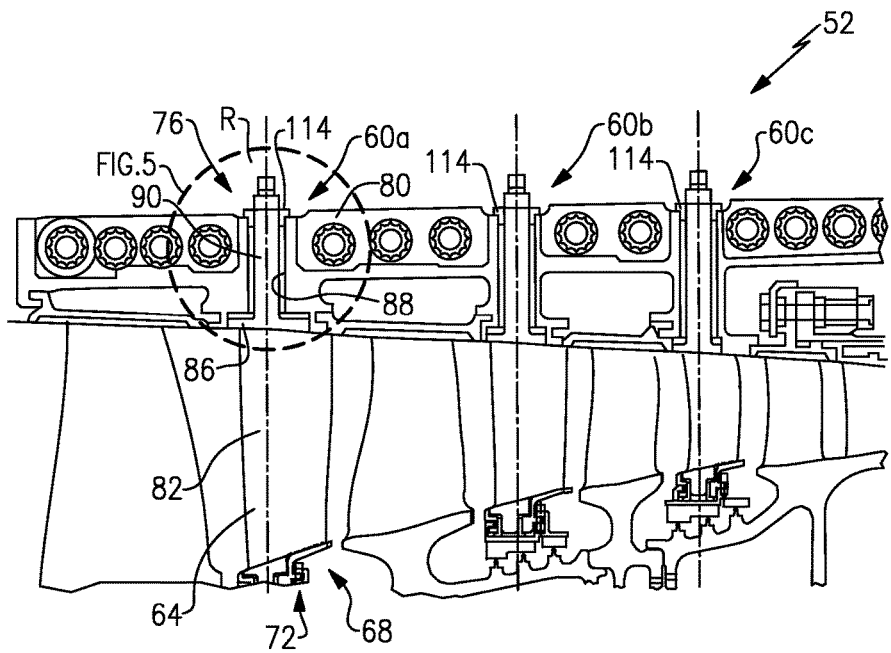
FIG. 2 shows a close up view of a compressor section of the engine of FIG. 1.
Figure 3:
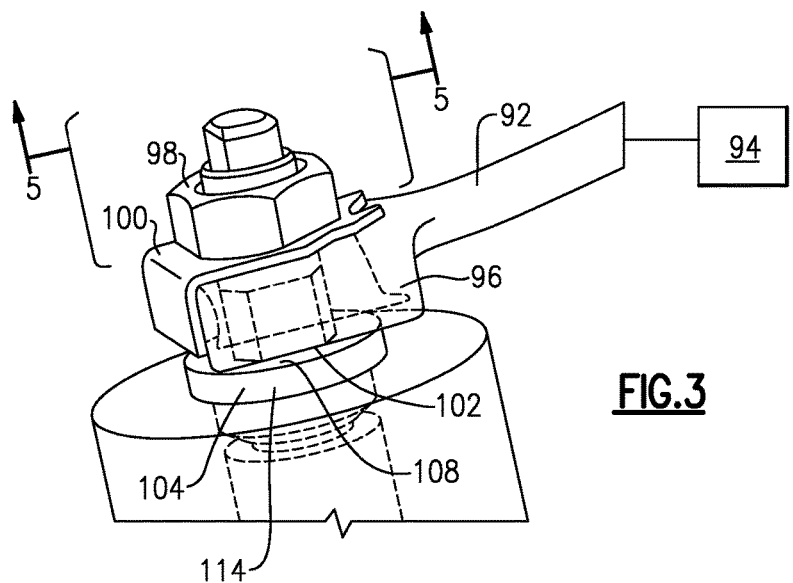
FIG. 3 shows a perspective view of interface between a portion of a variable vane and a case of the compressor section of FIG. 2.
Figure 5:
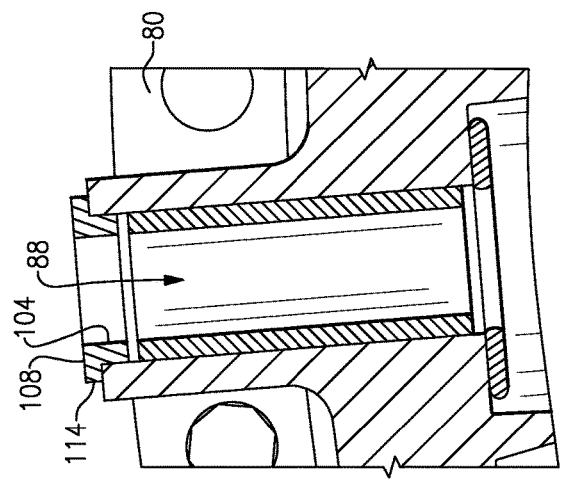
FIG. 5 shows a close-up view of Area 5 in FIG. 2 with a vane arm and attachment structure removed.
Figure 4:
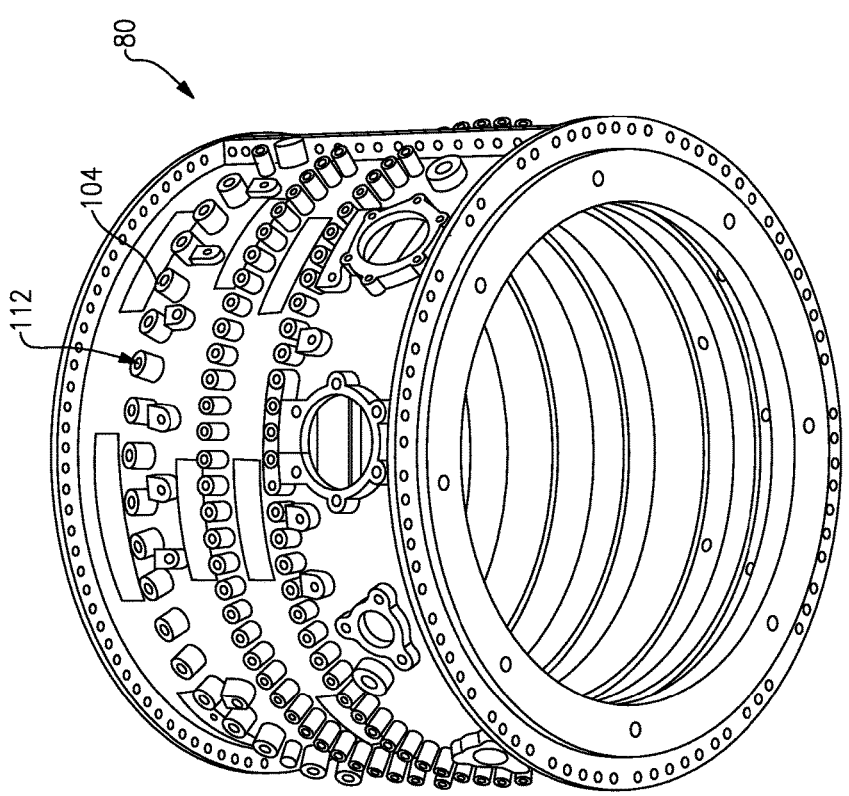
FIG. 4 shows a perspective view of the case of FIG. 3.

Referring to FIG. 2, the high-pressure compressor section 52 of the engine 20 includes arrays 60a-60c of variable vanes 64. Each of the arrays 60a-60c include individual variable vanes 64 extending radially away from the axis A. The variable vanes 64 have a radially inner end 68 mounted to a core 72 of the engine 20, and a radially outer end 76 mounted to a case structure 80 of the engine 20.

During operation, the variable vane 64 may be rotated back and forth about a respective radial axis R extending from the axis A. Rotating the variable vane 64 influences flow through the high-pressure compressor 52 of the engine 20 by permitting more or less flow through the respective stage of the compressor section 52.

In this example, each variable vane 64 includes an airfoil portion 82, a button portion 86, and a stem 90. The button portion 86 and the stem 90 are received within a bore 88 of the case structure 80. A portion of the stem 90 extends radially outside the bore 88.

A vane arm 92 couples the variable vane 64 to an actuator assembly 94. In this example, the vane arm 92 and the variable vane 64 provide a variable vane assembly.

The example vane arm 92 includes a claw portion 96 that fits over the stem 90 of the variable vane 64. A threaded fastener 98 and a lock nut 100 are used, in this example, to hold the claw portion 96 in position over the stem 90. The claw portion 96 includes surfaces 102 directed radially inward toward the axis A. The vane arm 92 is moved by the actuator assembly 94 to rotate the variable vane 64.

A bushing 104 provides a contact surface 108 facing radially outward away from the axis A. When flow through the engine 20 biases the variable vane 64 away from the axis A, the contact surface 108 is spaced from the surfaces 102 of the claw portion 96. When flow through the engine 20 causes the variable vane 64 to be biased toward the axis A, the variable vane assembly moves such that the contact surface 108 contacts the surfaces 102 of the claw portion 96.

The bushing 104, in this example, is a nickel material such as an Inconel 718. The material of the bushing 104 provides a suitable interface for withstanding contact with the vane arm 92, which is also nickel in this example.

The bushing 104 is press-fit into a bore 112 established within the case structure 80, which is made of a titanium or composite material in this example. Once press-fit, interference between the bushing 104 and the case-structure 80 holds the position of the bushing 104. A flange 114 limits movement of the bushing 104 into the bore 112 during the press-fitting. The flange 144 includes the contact surface 108 in this example. The flange 144 extends outward from other portions of the bushing 104.

The bushing 104 protects the case structure 80 from damage associated with contact with the claw portion 96, which is part of the variable vane assembly. That is, without the bushing 104, the surfaces 102 of the claw portion 96 could contact and damage the case structure 80.

Contact between the surfaces 102 of the claw portion 96 and the bushing 104 also limits movement of the variable vane 64 toward the axis A. The movement may be limited such that the button portion 86 does not protrude into a flow path of the engine 20 when the variable vane 64 is biased toward the rotational axis A.

Features of these disclosed examples include limiting or preventing movement of a variable vane to a radially inward position where damaging contact between the variable vanes and associated vane arms with a case structure could occur. Another feature includes providing a specialized wear surface when the variable vanes are biased radially inward.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A turbomachine assembly, comprising:
   a bushing having a wear surface configured to interface directly with a variable vane assembly to limit radially inward movement of the variable vane assembly; and
   a vane arm of the variable vane assembly, the vane arm including a claw portion with a plurality of separate claw surfaces facing radially inward, the plurality of claw surfaces configured to contact the wear surface of the bushing.

2. The turbomachine assembly of claim 1, wherein the wear surface faces radially away from a rotational axis of a turbomachine.

3. The turbomachine assembly of claim 1, wherein at least a portion of the bushing is received within a bore that also receives a portion of the variable vane assembly.

4. The turbomachine assembly of claim 1, wherein the bushing comprises nickel.

5. The turbomachine assembly of claim 1, wherein the bushing and a portion of the variable vane assembly that contacts the wear surface are made of the same material.

6. The turbomachine assembly of claim 1, wherein contact between the claw surfaces and the bushing limits radial movement of the variable vane such that a button portion of the variable vane does not protrude into a flowpath of a gas turbine engine.

7. The turbomachine assembly of claim 1, wherein a first one of the plurality of claw surfaces is on a first side of a vane stem of the variable vane assembly and a second one of the plurality of claw surfaces is on an opposing, second side of the vane stem.

8. The turbomachine assembly of claim 1, further comprising a lock nut to hold the claw portion in position over a vane stem of the variable vane assembly, the lock nut including a portion providing an aperture that receives the vane stem and a flange extending radially from the portion.

9. The turbomachine assembly of claim 1, wherein the claw portion comprises a portion providing an aperture that receives a vane stem of the variable vane assembly, and a plurality of flanges extending radially inward from the claw portion and terminating at respective claw surfaces.

10. A turbomachine assembly, comprising:
    an annular case;
    a bushing;
    a variable vane having a portion received within a bore of the case; and
    a vane arm configured to rotate the variable vane, wherein the vane arm includes a plurality of claw surfaces facing radially inward toward a rotational axis and configured to contact the bushing, the claw surfaces separate and distinct from each other.

11. The turbomachine assembly of claim 10, wherein the annular case is a compressor case.

12. The turbomachine assembly of claim 10, wherein the bushing is press-fit within the bore.

13. The turbomachine assembly of claim 10, wherein the vane arm provides an aperture that receives a portion of the variable vane.

14. The turbomachine assembly of claim 13, wherein the portion of the variable vane comprises a vane stem.

15. The turbomachine assembly of claim 10, wherein contact between the claw surfaces and the bushing limits radial movement of the variable vane such that a button portion of the variable vane does not protrude into a flow-path of a gas turbine engine.

16. The turbomachine assembly of claim 10, further comprising a lock nut to hold a claw apertured portion in position over a vane stem of the variable vane assembly, the lock nut including an apertured portion providing an aperture that receives the vane stem and a flange extending radially from the apertured portion, wherein a first one of the plurality of claw surfaces is on a first side of a vane stem of the variable vane assembly and a second one of the plurality of claw surfaces is on an opposing, second side of the vane stem.

17. A method of limiting wear in a turbomachine, comprising:
    providing a bushing wear surface that contacts a plurality of separate claw surfaces of a variable vane assembly when the variable vane assembly is moved toward a rotational axis of a turbomachine.

18. The method of claim 17, including moving the variable vane assembly away from the bushing wear surface when the assembly is biased away from the rotational axis of the turbomachine.

19. The method of claim 17, wherein the plurality of separate claw surfaces face the rotational axis.

20. The method of claim 17, wherein contact between the plurality of separate claw surfaces and the bushing limits radial movement of the variable vane such that a button portion of the variable vane does not protrude into a flow-path of a gas turbine engine.

* * * * *